(12) United States Patent
Beguin

(10) Patent No.: US 9,729,649 B1
(45) Date of Patent: Aug. 8, 2017

(54) SYSTEMS AND METHODS FOR CONTROLLING THE AVAILABILITY OF COMMUNICATION APPLICATIONS

(75) Inventor: Julien G. Beguin, San Francisco, CA (US)

(73) Assignee: Amazon Technologies, Inc., Reno, NV (US)

(*) Notice: Subject to any disclaimer, the term of this patent is extended or adjusted under 35 U.S.C. 154(b) by 769 days.

(21) Appl. No.: 13/586,530

(22) Filed: Aug. 15, 2012

(51) Int. Cl.
*G06F 15/173* (2006.01)
*H04L 29/08* (2006.01)
*H04L 12/58* (2006.01)
*H04L 12/18* (2006.01)

(52) U.S. Cl.
CPC ............ *H04L 67/24* (2013.01); *H04L 12/581* (2013.01); *H04L 12/1813* (2013.01); *H04L 29/08684* (2013.01)

(58) Field of Classification Search
CPC ... H04L 12/1813; H04L 12/581; H04L 67/24; H04L 29/08684
See application file for complete search history.

(56) References Cited

U.S. PATENT DOCUMENTS

| | | | | |
|---|---|---|---|---|
| 2006/0009243 A1* | 1/2006 | Dahan | ................... | H04L 12/581 455/466 |
| 2006/0031470 A1* | 2/2006 | Chen | ................... | G06Q 10/107 709/224 |
| 2008/0102802 A1* | 5/2008 | Do et al. | ................... | 455/414.2 |
| 2009/0111509 A1* | 4/2009 | Mednieks et al. | ......... | 455/552.1 |
| 2010/0299615 A1* | 11/2010 | Miluzzo | ................... | H04W 4/02 715/752 |
| 2011/0183645 A1* | 7/2011 | Chawla | ............. | H04M 3/42357 455/410 |
| 2014/0019626 A1* | 1/2014 | Hubler | ................ | H04L 65/1006 709/227 |

* cited by examiner

*Primary Examiner* — June Sison
*Assistant Examiner* — Steven Nguyen
(74) *Attorney, Agent, or Firm* — Eversheds Sutherland (US) LLP

(57) ABSTRACT

This disclosure relates to systems and methods for managing communication application availability based, at least in part, on a user's willingness or unwillingness to communicate with another user. In one instance, the availability may apply to all the communication applications associated with a device using a single interface. In another instance, the availability may be communication applications specific, in that a user may specify one communication application as available and another communication as unavailable from a single interface. The availability information may be provided to other users who may elect to use an available communication application that is more likely to get a faster response than when using an unavailable communication. In another instance, the user may manage communication application availability based on the time and location of the user device.

28 Claims, 10 Drawing Sheets

SYSTEMS AND METHODS FOR CONTROLLING THE AVAILABILITY OF COMMUNICATION APPLICATIONS

BACKGROUND

As mobile communication devices are increasingly being used as a platform for mobile messaging using instant messaging systems that incorporate presence functionality. Often, these messaging systems take the form of third-party applications. Users may run several messaging programs at the same time in the background on their device so that they can be contacted in different ways. One aspect of these messaging systems is based on the other users being able to determine the availability of another user before they send a message. Availability may also determine whether a user even attempts to send a message. Therefore, the effectiveness or utilization of the messaging systems may increase when accurate availability information is available. However, managing availability states for several disparate messaging systems may be time consuming and difficult to manage.

Figure 1:
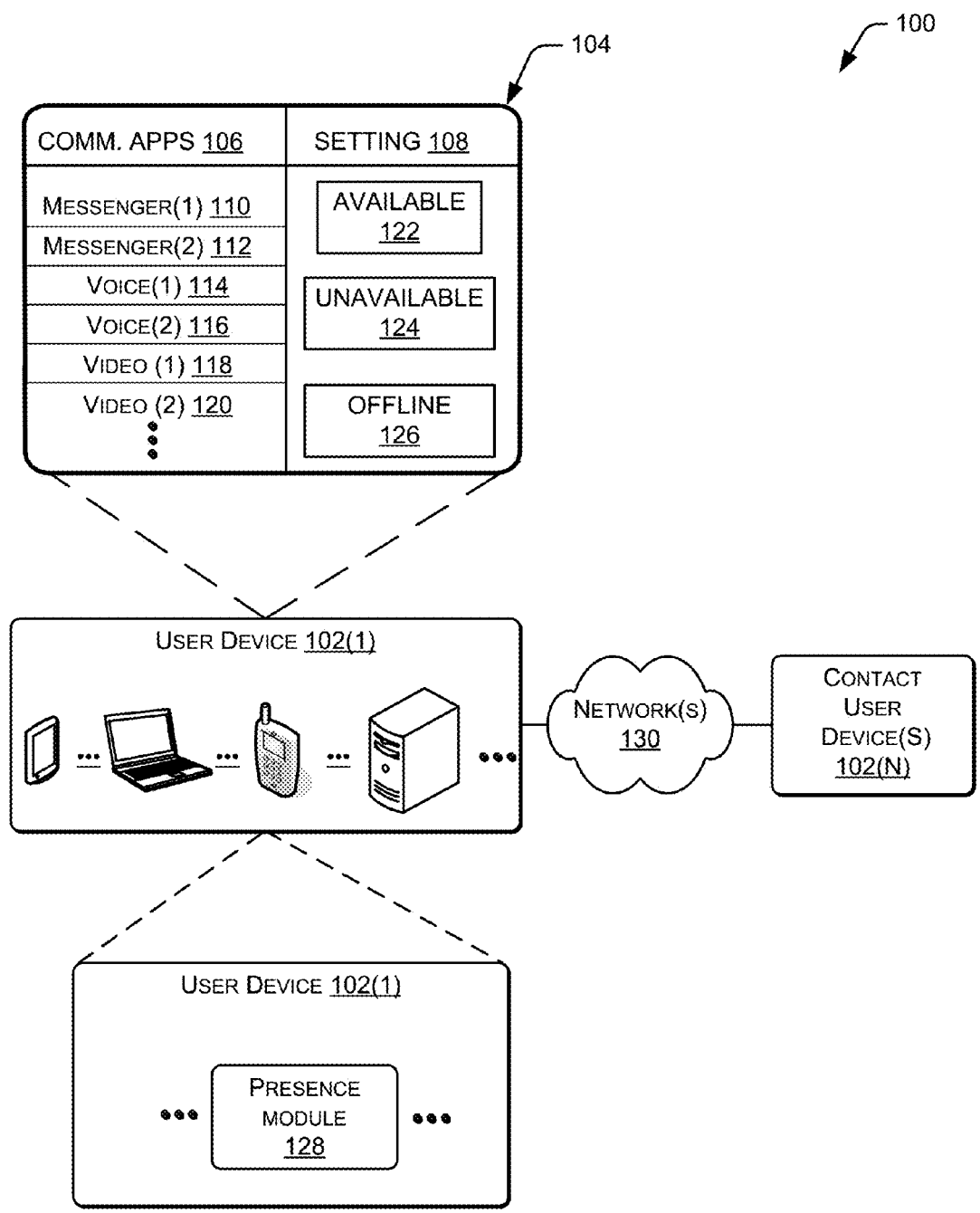
FIG. 1 illustrates a representative embodiment for collectively controlling the status of multiple communications applications using a single interface in accordance with one or more embodiments of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Described herein are systems and methods for collectively or individually managing the availability status of messaging applications using a single user interface on a messaging platform or device.

Instant communication using a variety of messaging applications has greatly increased as the capability of mobile devices has grown to expand beyond cellular telephone calls to include text and video. Accordingly, mobile device users have far greater options in determining how they communicate with other users. A desired form of communication may be selected based on the type of information they need to convey, their location (e.g., at work, at home, at a restaurant), the time of day (e.g., nighttime, daytime), or any other situation that may make one form of communication more desirable than another form. In some instances, the user may have to choose between more than one application that provides similar communication capability.

One drawback from all these messaging options may be that each of the applications may be managed individually. This may be done by accessing each application and adjusting the availability state for each application. A time consuming process that may be prone to error or omission as a user cycles through their list of messaging applications. Accordingly, this disclosure describes systems and methods that enable a user to manage their availability status for multiple messaging applications through a single interface.

In one embodiment, a mobile device may aggregate the status information from the available messaging applications and may present the list of applications on a display screen. An interface may enable a user to select a collective availability status (e.g., available, unavailable, or offline) for all of the applications. In one instance, the collective status change may be implemented using a selectable element presented on the display screen. In another instance, the collective status change may be implemented using a switch or button (e.g., ring tone switch, home page button, on/off button) that may be physically actuated by the user. Therefore, a user may quickly change their availability status to avoid unwanted communications or to encourage communication from other users across multiple messaging applications.

In another embodiment, a single interface may also aggregate the availability status for each communication application and enable the toggling or changing of each individual availability indicator. In this way, a user may select which messaging applications are more likely to be used by the user at a particular time. For example, the user may elect to use their communication applications that may be used by their friends when they are at home. Alternatively, the user may elect to use their work related communication applications when at work. In another instance, the user may prefer to use text communication over voice or video communication based on their current situation. For example, voice/video communication may not be desirable in noisy environments or a public environment. In contrast, voice/video communication may be desirable when the type of information to be conveyed is too complicated to convey in a text message or privacy and noise is not an issue.

Another embodiment may include a contact interface that may be used to display a user's contacts and their contact information. The contact information may include the types of communication applications that are associated with each user. Additionally, the contact interface may also aggregate any availability information associated with the communication applications. For example, the contact interface may display the status for multiple text, voice, or video applications. Therefore, a user may select a form of communication along with a specific communication application from a group of similar communication applications associated with a contact. For example, if a contact has two text applications the user may select the text application with an available status or select between the two of them if both text applications are shown as available. This selection process may also apply to voice or video applications.

Illustrative System

FIG. 1 illustrates a collective control embodiment 100 of a user device 102(1) that may be in communication with one or more contact user devices 102(N). The letter N representing an integer that is greater than 1 that corresponds to the one or more users that may be in communication with the user device 102(1). As shown in FIG. 1, the user device 102(1) may be one or a variety of communication devices that may include, but are not limited to, smartphones, mobile phones, laptop computer, desktop computer, tablet computers, televisions, set-top boxes, game consoles, in-vehicle computer systems, and so forth. The other contact user devices 102(N) may include the same or similar devices mentioned for the user device 102(1) that may be in communication with the user device 102(1) over a network 130. The user devices 102(1), 102(N) will be described in greater detail in the description of FIG. 6. However, the presence module 128 of the user device 102(1) will be briefly discussed in the description of FIG. 1 below.

The user device 102(1) may include a display screen that may display an interface 104 that includes the communication applications 106 that may be used to communicate with the other contact user devices 102(N). The interface may include a list of communication applications 106 and a list of status or availability settings 108. For example, the user device 102(1) may include several different types of applications and several applications that may communicate in a similar matter to each other. The text applications may include a messenger(1) 110 and messenger(2) 112 which may be text applications being run by two different providers. For example, messenger(1) may be an application for a text service by a mobile phone service company and messenger(2) may be an application provided by social media company or the user device 102(1) manufacturer. The voice and video applications may include voice(1) 114, voice(2) 116, video(1) 118, and video(2) 120. Voice(1) 114 may be operated by a mobile phone service company and voice(2) 116 may be operated by a voice over internet protocol company. Similarly, the video applications 118, 120 may be operated by two different video service providers. All of these applications may use different interfaces to communicate with other users and may use different availability indicators to let other users know that they are available to communicate. The settings 108 may enable the user of the user device 102(1) to control a collective availability status for the communication applications 106. In another embodiment, the communication applications 106 may also include, but are not limited to, gaming applications, file sharing applications, content sharing applications, remote control applications, and/or multi-way communications.

In one embodiment, the settings 108 may include an available indicator 122, an unavailable indicator 124, and an offline indicator 126. The available indicator 122 may be an interactive electronic element that may be selected by the user (not shown). Selecting the available indicator 122 may direct the presence module 128 to update or change the status setting for the list communication applications 106 to available. In that, available may mean that the user is willing to communicate with other users using at least one of the communication applications 106. The user may also select the unavailable indicator 124 to direct the presence module 128 to change the availability status of the communication applications 106 to unavailable. In this instance, unavailable may mean that the user may be unwilling to communicate with other users using the communication applications 106. The user may be able to send and receive communications, but they are not being solicited from other users (e.g., 102(1). The offline indicator 126 may place the communication applications 106 in an offline mode that will either shutdown the communications applications 106 or make them unable to send or receive messages. For example, the user may select the available indicator 122 to inform their network of contacts that the user may be willing to communicate with them using any one of the communication application 106. The network of contacts may be notified by the presence module 128 via a contact list (not shown) stored on the user device 102(1). In another instance, the presence module 128 may inform service providers (not shown) associated with the communication applications 106 that the user may be willing to communicate with other users.

The presence module 128 may be programmed by the user to include the communication applications 106 in the interface 104. In one instance, the user may be prompted to register the communication applications 106 when a new application is installed on the user device 102(1). In another instance, the presence module 128 may monitor incoming or outgoing communications to other contact user devices 102(N) to determine which applications may provide availability updates to other users. If so, the presence module 128 may prompt the user to include the new communication application under the collective availability control feature used with the existing communication applications 106. The concept of availability may also include the concept of presence of a user. In that the presence information may include a status indicator that announces the ability and/or willingness of a user to communication with other users using one or more communications applications.

In another embodiment, the user device 102(1) may send a periodic signal to one or more service providers associated with the communication applications 106. The periodic signal may be an indication that the user device 102(1) is on and in communication with one or more networks 130. When the user device fails to send the periodic signal, the service providers may change the availability status for the communications applications to offline.

However, in certain instances, the user may not want to include every communication using collective control to force all the communication applications 106 to have the same availability status.

Figure 2:
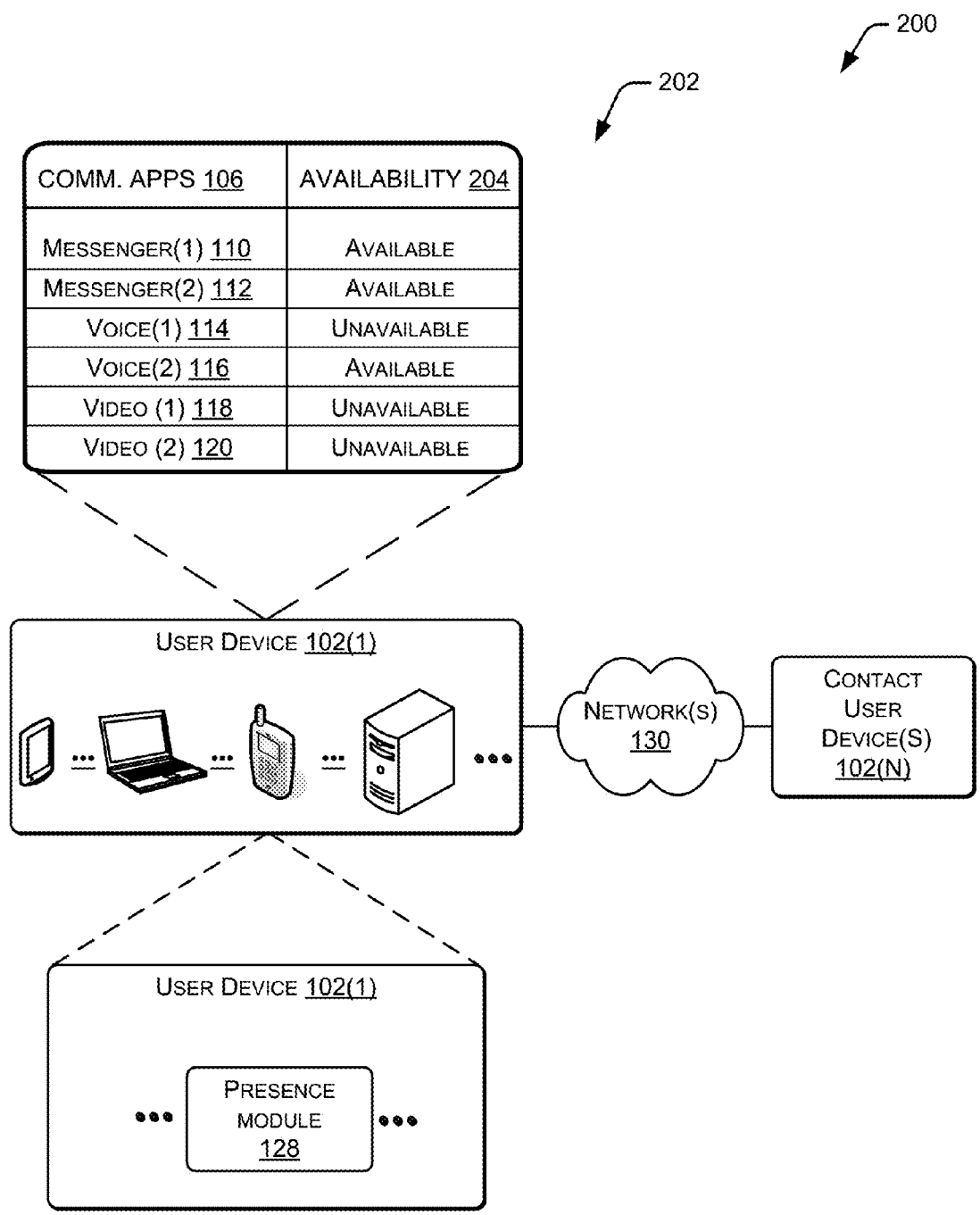
FIG. 2 illustrates a representative embodiment for individually controlling the status of multiple communications applications using a single interface in accordance with one or more embodiments of the disclosure.

FIG. 2 illustrates a representative embodiment 200 for individually controlling the status of multiple communications applications 106 residing on the user device 102(1) using an individual interface 202. As noted above, the user device 102(1) may communicate availability information associated with the communications applications 106 to other contact user devices 102(N) that may use the same or similar communication applications over a network 130.

In this embodiment 200, the communications applications 106 are associated with individual availability status indictors 204. As shown in FIG. 2, each communication application (e.g., messenger(1) 110 . . . video(2) 120) has its own availability indicator 204. In this example, the messenger(1) 110, messenger(2) 112, and voice(2) 116 are shown as being available and that the user is willing to communicate with other contact user devices 102(N) using those designated communication applications. In contrast, the voice(1) 114, video(1) 118, and video(2) 120 are shown as being unavailable, indicating that the user is unwilling to communicate with other contact user devices 102(N) using those communications applications. In another embodiment, the availability 204 for the communications applications 106 may also include an offline state (not shown). The offline state may indicate that the communication application is unable to send or receive messages or any other information. In yet another embodiment, the availability status indicators 204 may include customized states, such as, out to lunch, gone fishing, be right back, napping, working out, eating, in school, at home, on the phone, chatting, in a meeting, shopping, or don't even think about reaching me.

In another embodiment, the presence module 128 may use an application program interface to send or receive availability status indicators to or from the communication applications 106 and the service providers associated with the communication applications 106. The application program interface may query the service provider or the communication applications 106 to obtain the availability status indicators or provide the availability status indicators 204 to the service providers.

The availability status 204 for each communication application 106 may be switched or toggled to another state by interacting with the individual interface 202. In one example, the individual availability indicators 204 may be selectable and prompt the user to select another state (e.g., available, unavailable, or offline). When an availability status change occurs, the user device 102(1) may provide the update availability information to the other contact user devices 102(N) or to a service provider associated with the communication application.

Figure 3:
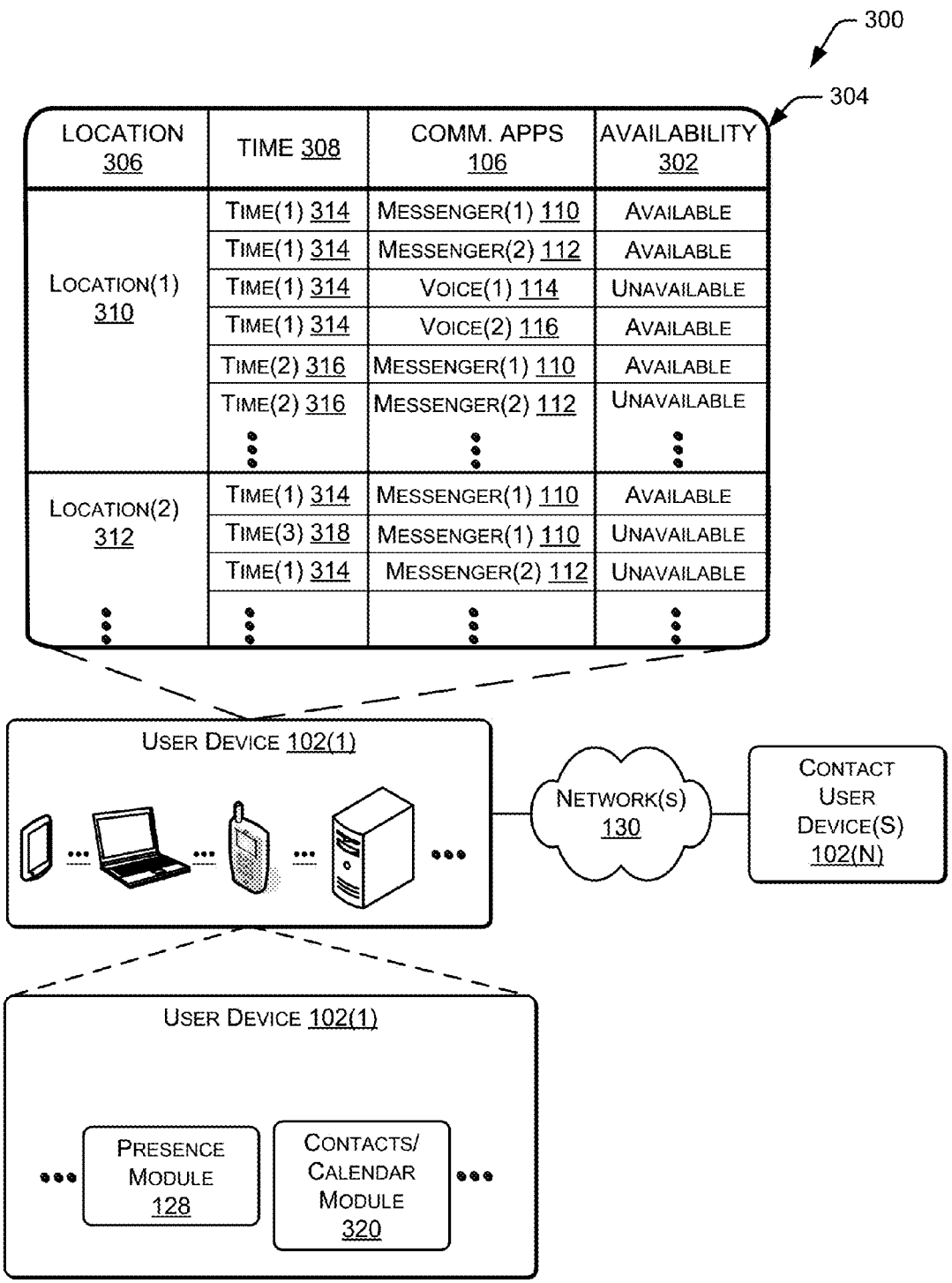
FIG. 3 illustrates a representative embodiment for a communication application that specifies the availability status for the contacts based in part on a location and/or time in accordance with one or more embodiments of the disclosure.

FIG. 3 illustrates a representative embodiment 300 for individually controlling the availability 302 of multiple communications applications 106 using a presence interface 304 based, at least in part, on the location 306 and time 308 associated with the user device 102(1). In this embodiment 300, the user device 102(1) may provide availability 302 information to the other contact user devices 102(N).

In one embodiment, the presence module 128 may have availability guidelines based on the location and/or time associated with the user device 102(1). For example, locations(1) 310 (e.g., work) and location(2) 312 (e.g., home). The location capability enables the selection of availability based on whether the user may be at work or at home. This may be helpful in segregating work related communication from personal communication. For example, work related communication applications may be listed as available whenever the user is located at the office or place of business and unavailable when the user is at home or not at the office. In one instance, a location may be specified to include certain availability conditions, but when the user device 102(1) is not within that location or another specified location the presence module 128 may revert to availability conditions based on one or more default availability conditions.

In some instances, the specified location may even apply to specific rooms within a building or home. For example, the user device 102(1) may indicate availability when the user is in their office at their desk. However, if the user is located in a conference room the user device 102(1) may indicate the communication applications 106 are unavailable. This is assuming that the user is in a meeting when in the conference room and does not want to communicate with other users during this time. In another instance, location availability may be dependent on the location of the user device 102(1) within the home. For example, the communication applications may be shown as unavailable when the user device 102(1) is in the kitchen or bedroom. However, the communication applications may be shown as available when the user device 102(1) is located in the home office or any other space within or nearby (e.g., front yard, back yard) the home.

In another embodiment 300, the presence interface 304 may include a location 306 and a time 308 that is associated with communication application 106 availability 302. For example, the individual availability 302 for each communication application 106 may also be associated with a specific location (e.g., location(1) 310 or location(2) 312) within a certain time period (e.g., time(1) 314 or time(2) 316). In one instance, the location(1) 310 may be associated with a workplace or office and location(2) 312 may be associated with a residence or non-work place (e.g., gym, school, . . . etc.). The locations may also be associated with availability time windows (e.g., time(1) 314, time(2) 316) in which the user may designate a time for when a communication application is available, unavailable, or offline. For example, time(1) 314 may be associated with a time window that may include 9:00 am-12:00 pm (e.g., working hours) and time(2) 316 may time 12:00 pm-1:00 pm (e.g., lunch). In this embodiment 300, the messenger applications (e.g., messenger(1) 110, messenger(2) 112,) and a voice application (e.g., voice(2) 116) are shown as available during time(1) 314. While another voice application (e.g., voice(1) 114) is unavailable during time(1) 314. For example, the messenger (1) 110 may be a cellular text based application and messenger(2) 112 may be a work based messaging application. During time(1) 314 (e.g., normal work period) both of these messaging applications are available. In contrast, one voice application (e.g., voice(1) 114 that may be a voice over internet protocol application that is unavailable during time (1) 314. This may be done since the voice over internet protocol application may be mostly used for personal purposes and the user may be unwilling to use the application during work hours. However, another voice application (e.g., voice(2) 116) may be available during time(1) 314. Voice(2) 116 may be an application associated with a cellular telephone service and the user wants to be available for cell service during work hours.

However, during lunch (e.g., time(2) 316), while the user is at work (e.g., location(1) 310), the work messenger application (e.g., messenger(2) 112) may be shown as unavailable. But, the cellular text application (e.g., messenger(1) 110) is still shown as available during time(2) 316. Therefore, people who have access to the user's cell phone number, they may be shown that the user is available during lunch. But, co-workers who may not have access to the cell number or the cell service, may see that the user is unavailable based on the unavailability of the work based text application (e.g., messenger(2) 112) during time(2) 316).

In one embodiment, the user may enter the location 306, time 308, and availability 302 for each communication application 106 on an individual basis. However, the user device 102(1) may include a contacts/calendar module 320 that may provide the aforementioned information to the presence module 128 to generate entries to the individual availability interface 304 or for the collective availability interface 104. The contact/calendar module 320 may capture the availability information from the user when the calendar entry is created. For example, the calendar module may prompt the user to enter the availability information (e.g., communication application 106, availability 302, location 306, and time 308) when the user creates the calendar event. The contact/calendar module 320 or the presence module 128 may use default availability information when the user does not provide availability information with the calendar event. For example, if the calendar event is after working hours, the calendar module 320 or presence module 128 may assign the work related communications to unavailable. Conversely, when the calendar event is during work hours, the contact/calendar module 320 or the presence module 128 may assign the work related communication applications to available. Likewise, default rules may be applied to personal communication applications as well.

In another embodiment, an availability guideline for a text messenger(1) 110 application when the user device 102(1) may be at home (e.g., location(2) 312). For example, the text messenger(1) 110 may be available during time(1) 314. However, when a user goes to bed (e.g., time(3) 318) the text messenger(1) 110 may be shown as unavailable or offline.

Figure 4:
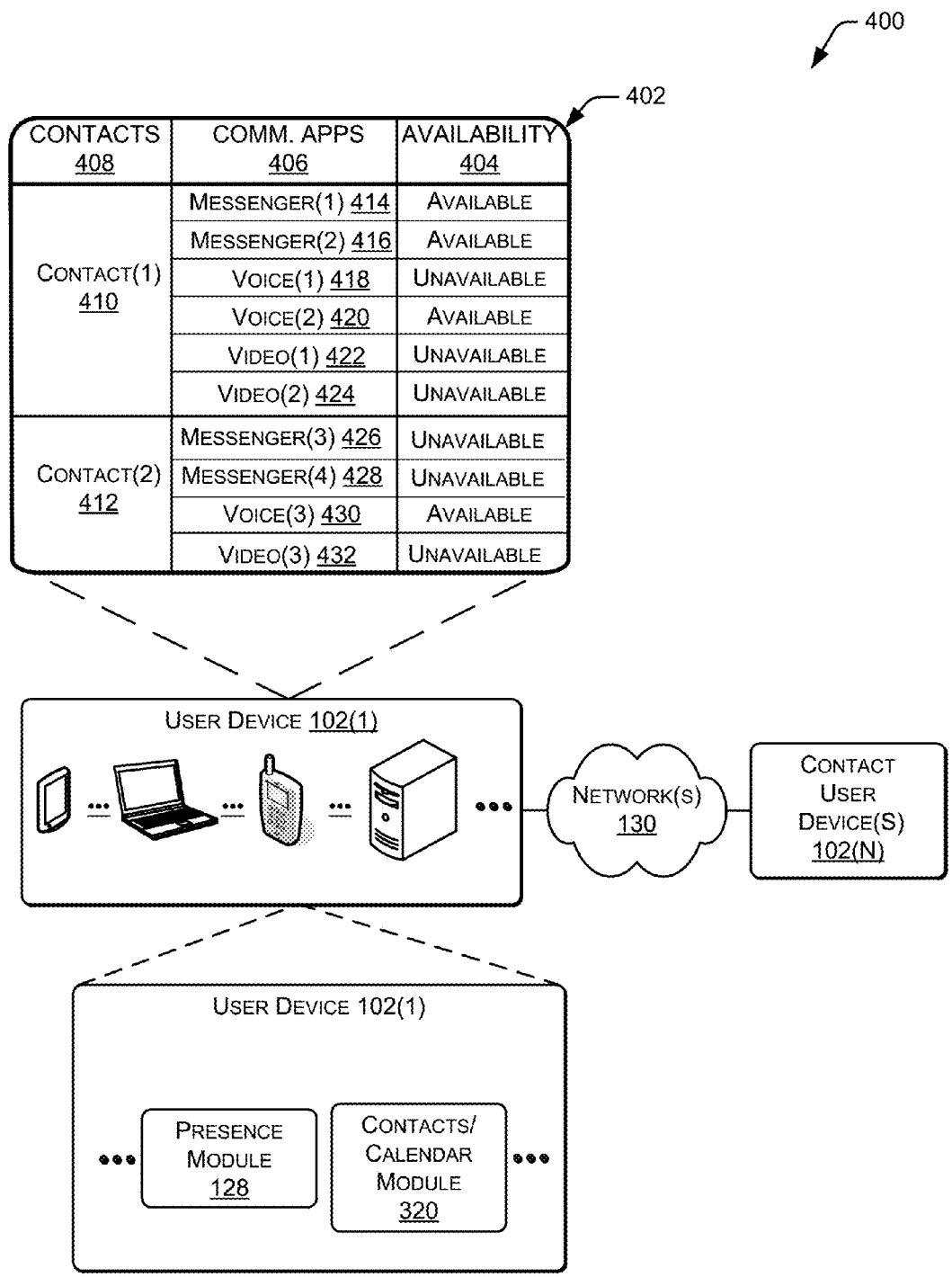
FIG. 4 illustrates a representative embodiment for a contact list associated with the status of multiple communications applications using a single interface based in accordance with one or more embodiments of the disclosure.

FIG. 4 illustrates a representative embodiment 400 for a contact list 402 that may include the availability 404 of communication applications 406 associated with other contact user devices 102(N) that the user device 102(1) may contact. In this embodiment, the contact list 402 may be organized by contact names 408 and may include more than one contact (e.g., contact(1) 410, contact(2) 412). The communication applications 406 associated with the contact user devices 102(N) may provide their availability 404 to the contacts module 320 of the user device 102(1). The contacts/calendar module 320 may organize the contact list 402 to provide availability information associated with the other contact user devices 102(N) and the corresponding communication applications 406. In this embodiment, the user of user device 102(1) may be able to determine whether the person they are attempting to contact is available or willing to communicate. The availability status of the other user (e.g., contact(1) 410 or contact(2) 412) may be shown near a communication application, as shown in FIG. 4, that indicates whether the other user is willing to communicate using that communication application. For example, contact (1) 410 has indicated they are available or willing to communicate using the following communication applications: text messenger(1) 414, text messenger(2) 416, voice (2) 420 (e.g., cellular phone). Contact(1) 410 has also indicated that they are unavailable or unwilling to communicate using the following communication applications: voice(1) 418 (e.g., voice over internet protocol), video(1) 422, and video(2) 424. Similarly, contact(2) 412 has indicated that they are available or willing to communicate using a voice(3) 430 communication application and unavailable or unwilling to communicate using the following communication applications: text messenger(3) 426, text messenger (4) 428, and video(3) 432.

In another embodiment, the availability status may not be communication application specific, rather the availability status may just indicate the contact(1) 410 is generally available. In this instance, the user (e.g., user device 102(1)) may select any communication application 406 to communicate with the other user (e.g., contact(1) 410) without an indication of which communication application 406 is more likely to receive a response from the other user (e.g., contact(1) 410).

Although FIG. 4 shows an integrated contact list 402 that includes multiple communication applications per contact 410. A contact list may also just include a single communication application per contact name. For example, the contact list may include a name, a cell phone associated with the name, and the availability associated with the cell phone.

Figure 5:
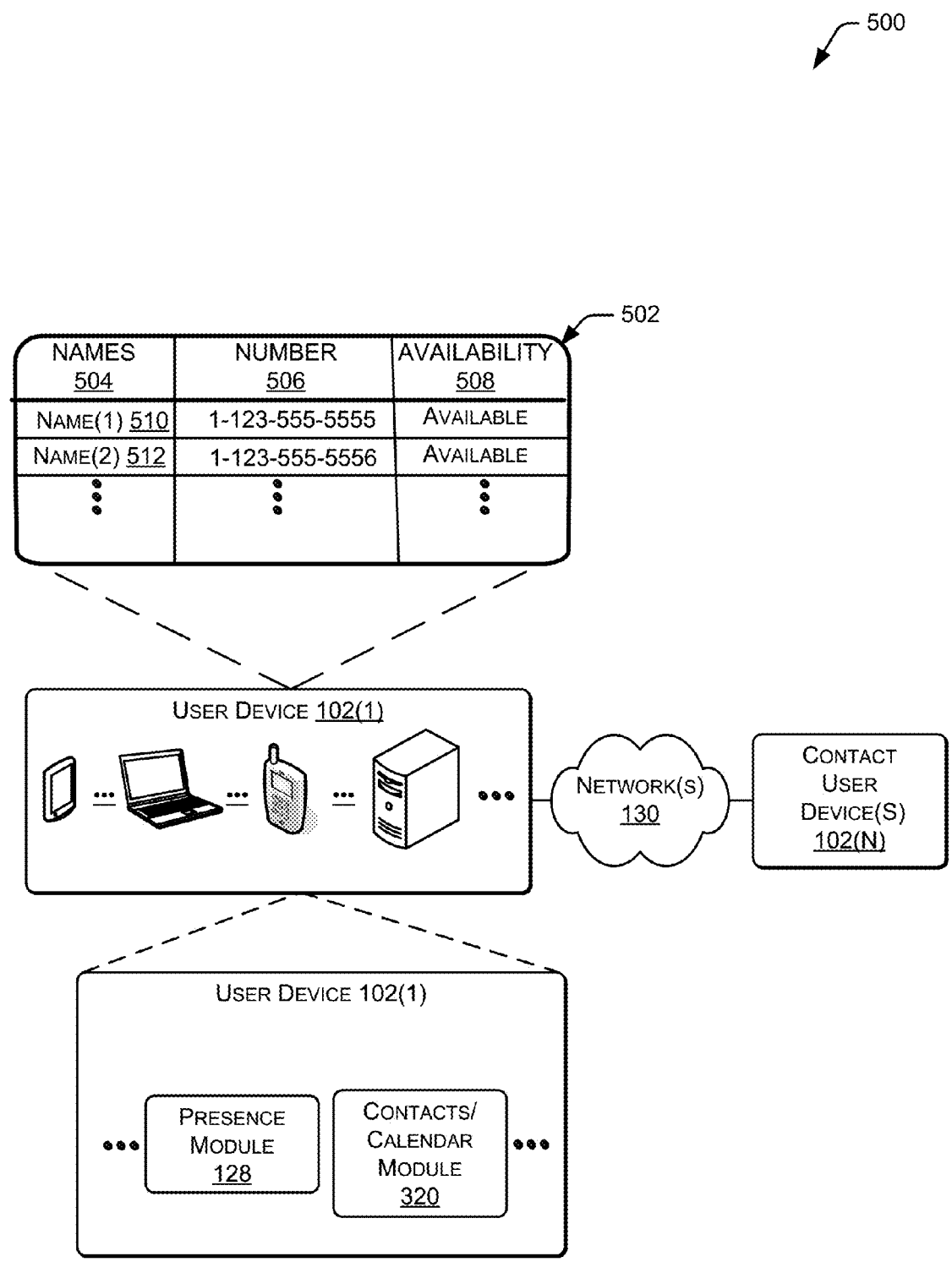
FIG. 5 illustrates a representative embodiment for a contact list associated with a single communication application that indicates whether a contact is available to communicate in accordance with one or more embodiments of the disclosure.

FIG. 5 illustrates a representative embodiment 500 for a contact list 502 that may include the names 504 and contact numbers 506 that the user device 102(1) may use to communicate with other users (e.g., contact user devices 102(N)) using a communication application. In this embodiment 500, the contact list 502 may include a list of names (e.g., name(1) 510 and name(2) 512) and associated contact information (e.g., numbers 506) that may be used to contact the other contact user device 102(N) using a cellular phone service or a cellular text messaging service. The user may select the name(1) 510 or the associated number to initiate contact with the other contact user device 102(N). The availability 508 may be shown adjacent to the name(1) 510 or number as shown in FIG. 5. However, the availability 508 may displayed when the name(1) 510 or number is selected by the user. For example, an availability element may be shown when the user hovers over the name(1) 510 or number in the contact list 502. The hovering may be done when a finger (i.e., on a touch screen device) or mouse cursor hovers over at least a portion of the name(1) 510 or its associated number.

In another instance, the availability 508 associated with the name(1) 510 may be shown the name(1) 510 or its associated number are selected or hovered over by finger or cursor when the other user (e.g., contact user device 102(N) contact user device 102(N)) is unavailable. For example, the contact list 502 may include a display that the user is unavailable or that the other user is unavailable for that selected communication application. The contact list 502 may also display or prompt the user about other communication applications that the other user has deemed as available. When the other user's communication application is shown to be available, the user device 102(1) may just make the call or the text without displaying the availability information 508.

Figure 6:
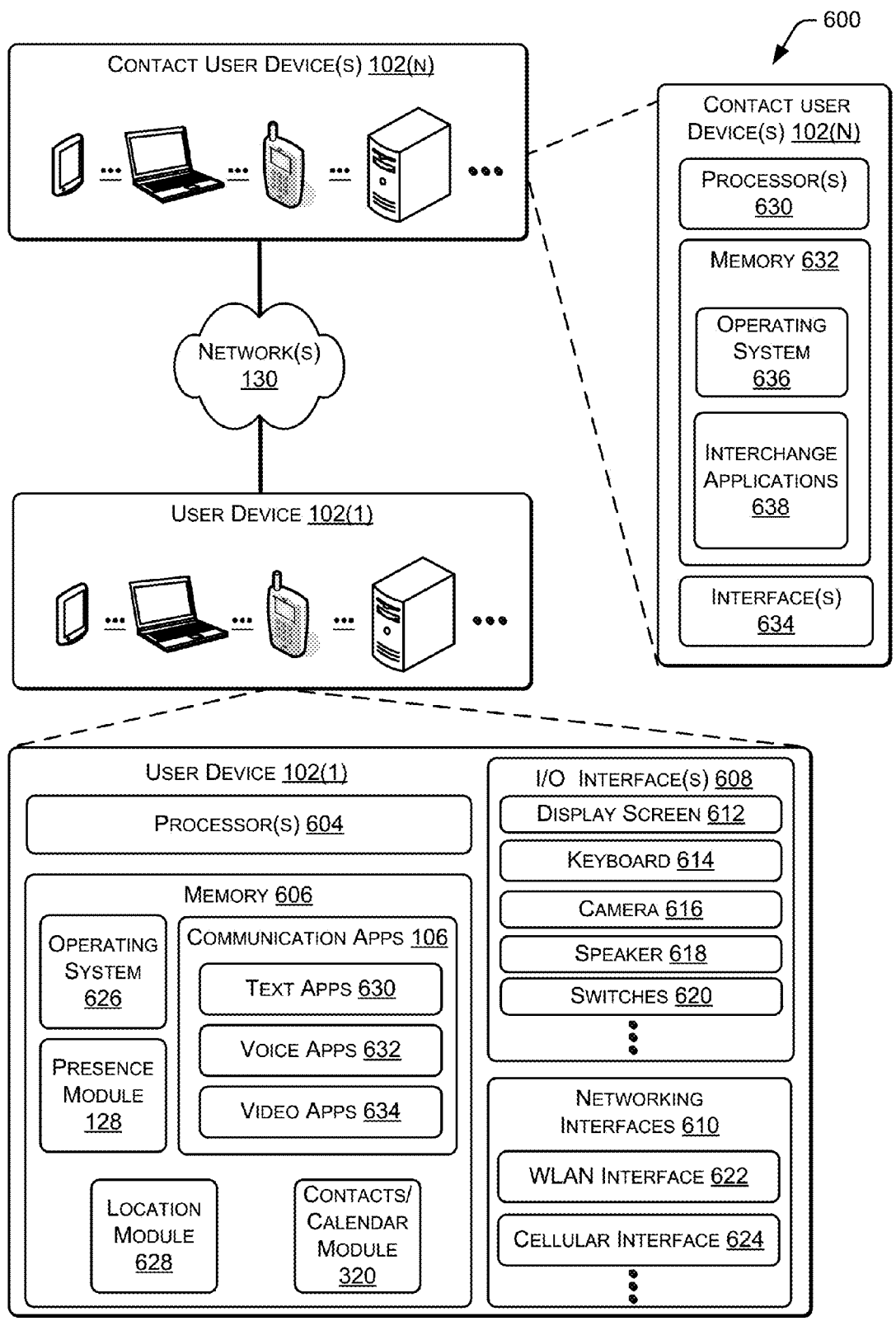
FIG. 6 illustrates a representative embodiment for a system that controls the status of communication applications using a single interface in accordance with one or more embodiments of the disclosure.

FIG. 6 illustrates a representative embodiment for a system 600 that controls the status of multiple communication applications 106 using a single interface 104 or 202. The communication applications 106 may enable the exchange of communication information (e.g., text, audio, and/or video) between a user device 102(1) and one or more other contact user devices 102(N). The communication information may be sent and received over one or more networks 130. The networks may include, but are not limited to, wired or wireless networks (e.g., cellular, Wi-Fi, and/or personal area networks). The user device 102(1), 102(N) may be configured to use one or more of these networks as needed.

The user device 102(1) may be one of a variety of communication devices that may include, but is not limited to, smartphones, mobile phones, laptop computers, desktop computers, tablet computers, televisions, set-top boxes, game consoles, in-vehicle computer systems, and so forth. The other contact user devices 102(N) may include the same or similar devices as mentioned for user device 102(1). As shown in FIG. 5, the user device 102(1) may include any one of the illustrated devices, but is not intended to be limited to just those devices. This also applies to the contact user devices 102(N).

The user device 102(1) may also include one or more computer processors 604, a memory 606, one or more I/O interfaces 608, and networking interfaces 610 to communicate with the other contact user devices 102(N).

The computer processors 604 may comprise one or more cores and are configured to access and execute (at least in part) computer-readable instructions stored in the one or more memories 606. The one or more computer processors 604 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 102(1) may also include a chipset (not shown) for controlling communications between the one or more computer processors 604 and one or more of the other components of the user device 102(1). In certain embodiments, the user device 102(1) may be based on an Intel® architecture or an ARM® architecture and the computer processor(s) 604 and chipset may be from a family of Intel® processors and chipsets. The one or more computer processors 604 may also include one or more application-specific integrated circuits (ASICs) or application-specific standard products (ASSPs) for handling specific data processing functions or tasks.

The I/O interfaces 608 may include coupling devices such as keyboards 614, joysticks, touch sensors, cameras 616, microphones, speakers 618, haptic output devices, memories, and so forth to the user device 102(1). The I/O interface 608 may also include mechanical switches 620 or buttons that may perform one or more of the following functions: power on/off, home page, volume, or toggle between ring mode, silent mode, or vibrate mode.

The ring mode may include playing an audio file that alerts the user to a condition on the user device 102(1). In one embodiment, the condition may include an incoming phone call, text message, video call, or any instance in which the user device 102(1) may need an input or response from the user. The audio file may include, but is not limited to, a ringing bell, music, or any sound that may be emitted from a speaker. In certain instances, an audio file may be assigned to a type of communication application 106 (e.g., phone, text). In another instance, an audio file may be associated with a specific type of communication application 106. For example, the user device 102(1) may include more than one type of text messaging service. In this embodiment, the text messages received by one of the text messaging service may be assigned its own audio file. Hence, the user will be able to distinguish which text messaging service received a message based, at least in part, on the audio file that is played.

The silent mode may include a visual prompt that alerts the user to a condition on the user device 102(1). The visual prompt may include, but is not limited to, a light source that turns on when an incoming call, text, or video is received by the user device 102(1). The light source may flash intermittently or periodically to draw the attention of the user. In one specific embodiment, the light source may include displaying an image or playing a video file.

The vibrate mode may include a physical stimulation prompt that alerts the user to a condition on the user device 102(1). The physical stimulation prompt may include, but is not limited to, a vibrating element that may include a vibrating motor that includes an off center mass that is actuated by the motor. The actuation may cause the user device 102(1) to move, shake, or vibrate. The user may feel the vibration and know that the user device 102(1) may need an input or a response. In certain instances, vibration noise may also alert the user when the user is not in physical contact with the device. For example, when the user device 102(1) is laying on a surface (e.g., desktop), the vibration may cause the phone to generate an audible sound (e.g., a buzzing or rattling noise) that may also prompt the user to interface with the user device 102(1).

The haptic output device may comprise one or more actuators, signal generators, and so forth. For example, the haptic output device may generate direct electrical stimulation of nerves of the user, actuate a piezoelectric element, actuate a motor, and so forth.

The network interfaces 610 may also comprise one or more communication interfaces or network interface devices to provide for the transfer of data between the user device 102(1) and another contact user device 102(N) directly such as in a peer-to-peer fashion, via a network 130, or both. The communication interfaces may include, but are not limited to: personal area networks ("PANs"), wired local area networks ("LANs"), wireless local area networks ("WLANs") 622, cellular networks 624, wireless wide area networks ("WWANs"), and so forth. In FIG. 6, the user device 102(1) is coupled to the network 130 via a wired connection. However, the wireless system interfaces may include the hardware and software to broadcast and receive messages either using the Wi-Fi Direct Standard (See; Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. The wireless system may include one or more transmitters and receivers or a transceiver (not shown) capable of operating in a broad range of operating frequencies governed by the IEEE 802.11 wireless standards or one or more of the following cellular standards: Global System for Mobile Communications (GSM™), Code Division Multiple Access (CDMA™), Universal Mobile Telecommunications System (UTMS™), Long Term Evolution (LTE™), General Packet Radio Service (GPRS™), High Speed Downlink Packet Access (HSDPA™), Evolution Data Optimized (EV-DO™). The communication interfaces may utilize acoustic, radio frequency, optical or other signals to exchange data between the user device 102(1) and another user device 102(N).

The one or more memories 606 comprise one or more computer-readable storage media ("CRSM"). In some embodiments, the one or more memories 606 may include non-transitory media such as random access memory ("RAM"), flash RAM, magnetic media, optical media, solid state media, and so forth. The one or more memories 606 may be volatile (in that information is retained while providing power) or non-volatile (in that information is retained without providing power.) Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 606 may store an operating system 626 that includes a plurality of computer-executable instructions that may be implemented by the computer processor 604 to perform a variety of tasks to operate the interface(s) 608, 610 and any other hardware installed on the user device 102(1). The memory 606 may also include a presence module 128, one or more communication applications 106, a location module 628, and contacts/calendar module 320.

The communication applications 106 may include, but are not limited to, text applications 630, voice applications 632, video applications 634, or any other application related to an electronic communication method or process. In some instances, the communication applications may utilize a communications service provider (not shown) that enables the transfer of communication information between the user device 102(1) and the other contact user devices 102(N). The communications service provider may include, but is not limited to, cellular service providers, WLAN service providers, personal area network devices that enable a near-field communication network, a voice over internet protocol service provider, a text messenger service provider, a video over internet protocol service provider.

The presence module 128 may store, manage, and/or organize any or all availability information 204 associated with the communications applications 106. Broadly, the availability information 204 may be an indication set by the user or the presence module 128 based on whether a user associated with the user device 102(1) is available or willing to communicate with another user (e.g., contact user device 102(N) contact user device 102(N). In one instance, the availability may be collectively associated with all the communications applications 106, as shown in FIG. 1. In that embodiment 100, the one or more communication applications 106 may be collectively selected to be in an available state, an unavailable state, or an offline state. The availability information may be provided to other users (e.g., contact user devices 102(N)) to inform them of the users (e.g., user device 102(1)) willingness or unwillingness to communicate via the communications applications 106.

In another embodiment 200, the presence module 128 may manage and organize availability information 204 the communication applications 106 individually. The presence module 128 may generate an individual interface 202 that includes one or more communication applications 106 and their associated individual availability information 204. As discussed above in FIG. 2, the individual availability information 204 may be provided to other users (e.g., contact user devices 102(N)) that attempt to contact the user (e.g., user device 102(1)). In this instance, the other users (e.g., contact user devices 102(N)) may be able to select a communication application 106 that is more likely to receive a response from the user (e.g., user device 102(1)). For example, the user may prefer to communicate using a text messenger(1) 110 instead of using a phone (e.g., voice(1) 114). In this embodiment 200, the other users (e.g., contact user devices 102(N)) may determine to use the text messenger(1) 110 to obtain a faster response from the user based, at least in part on, the user expressing a willingness to communicate using the text messenger(1) 110 over the phone. In another instance, the other users may determine to wait until the user has changed the phone status to available before attempting to call the user. Of course, the other users may still call the user even when the phone status is unavailable and may leave a voice message for the user.

In another embodiment 300, the presence module 128 may manage and organize presence or availability interface 304 that is based, at least in part on, on a location 306 and a time 308. In addition to providing availability information 302 for individual communication applications 106, the presence module 128 may enable a user to enter in specific locations and times in which they are unavailable or that the individual communication applications may be unavailable. For example, a user may determine that when they are at work (e.g., location(1) 310) that certain communication applications 106 (e.g., text messenger(1) 110) should be listed as available and that other communication applications (e.g., voice(1) 114) should be listed as unavailable. In this case, the text messenger(1) 110 may be a work related messenger that enables the user to communicate with coworkers during working hours. The voice(1) application 114 may be a voice over internet protocol application that may be used to contact family or friends and the user may want that to be shown as unavailable while at work. The user may also have another availability profile associated with being at home (e.g., location(2) 312). The location module 628 may provide the location information to the presence module 128 to manage and enforce the location based availability guidelines stored in memory 606. The location module 628 may include, but is not limited to, a satellite-based global positioning system, a cellular service provider positioning system, a WLAN positioning system, or a combination thereof.

In addition to the location based availability, the presence module 128 may also incorporate a time component 308 into the location based availability information 302 or establish time availability information that is independent of location. For example, the user may establish that all communication applications are not available between the hours of 10:00 pm and 6:00 am regardless of where the user device 102(1) may be located. In another instance, the user may want to generate availability guidelines that are based on time and location. For example, when the user is located at work (e.g., location(1) 310) the user may want to make their work-related text messenger (e.g., messenger(2) 112) and their personal-related text messenger (e.g., messenger(1) 110) available during the morning time (e.g., time(1) 314). However, when they are on break or at lunch (e.g., time(2) 316), while at work, they may want to make the work-related text messenger unavailable and their personal-related messenger available.

This presence module 128 may also update communication application availability when the user device changes location. For example, when the user leaves work during working hours (e.g., time(1) 314) and goes home (e.g., location(2) 312) the presence module 128 may reference guidelines that make the work-related text messenger (e.g., messenger(2) 112) unavailable and the personal-relate text messenger (e.g., messenger(1) 110) available. However, the user may program the presence module 128 such that when the user is at home (e.g. location(2) 312) after 10:00 pm (e.g., time(3) 318) the personal-related text messenger (e.g., messenger(1) 110) is unavailable.

In this embodiment 300, the presence module 128 may monitor changes in location and time to update communication application availability. The updates may be sent periodically as the presence module 128 determines when availability information should be updated based on time or location or when the user directs the presence module 128 to make a change that may override the existing availability guidelines.

In another embodiment, the presence module 128 may interface with the contacts/calendar module 320 to update availability information on new calendar events in which the user has indicated a change for availability information associated with a communication application. For example, the user may create a calendar event for a meeting in which they do not want to receive telephone calls. In this instance, the presence module 128 may receive the availability information from the contact/calendar module 320 and update the presence interface 304 to reflect the changes to make the phone applications (e.g., voice(1) 114 and voice(2) 116) unavailable.

In another embodiment 400, the presence module 128 may collect availability information from other contact user devices 102(N). In conjunction with a contacts/calendar module 320, the presence module 128 may generate a contact list 402 that may include one or more contacts (e.g., contact(1) 410), communication applications 406 and their associated availability 404. Accordingly, the user (e.g., user device 102(1)) may be able to select a specific user (e.g., contact(1) 410) and determine which communication applications are more likely to elicit a timely response from another user (e.g., 102(N)) based, at least in part, on the availability information 404 associated with the communication application. Although the contact list may include an extensive list of each contacts communication applications, the presence module 128 and the contacts/calendar module 320 are not required to list all of the contacts communication applications.

In another embodiment 500, the contacts/calendar module 320 may generate a contact list 502 that includes contact names 504, their associated contact number 506, and the availability of the user (e.g., contact user device 102(N)). The contact list 502 references a single communication application (e.g., cellular phone or cellular text messenger). The contacts/calendar module 320 may store contact lists for each communication application and may receive availability information from the presence module 128 as needed. Hence, contact lists for each communication application may be generated or maintained by the contact/calendar module 320 or by the communication application itself. In another embodiment, the contacts/calendar module 320 may use an existing contact list (e.g., cellular phone) and may provide availability information when the user (e.g., user device 102(1)) attempts to dial another user (e.g., name(1) 510). The user may be prompted with a display window indicating that the other user is available, unavailable, or offline. In this way, the presence module 128 may be able to provide availability information using legacy or existing contact lists of the user device 102(1).

The other user device(s) 102(N) may include smartphones, laptops, desktops, tablet computers, televisions, set-top boxes, game consoles, in-vehicle computer systems, and so forth. The contact user device 102(N) may comprise one or more processors 630, one or more memories 632, and one or more interfaces 634. These interfaces 634 allow for the coupling devices such as keyboards, joysticks, touch sensors, cameras, microphones, speakers, haptic output devices, memories, and so forth to the contact user device 102(N). The haptic output device may comprise one or more actuators, signal generators, and so forth. For example, the haptic output device may generate direct electrical stimulation of nerves of the user, actuate a piezoelectric element, actuate a motor, and so forth. The interfaces 634 may also include a wireless or wired communications interface or a network interface device that enable the contact user device 102(N) to send and receive communications over the network 130. The wireless communication systems (not shown) may be similar to the wireless system described above.

The one or more processors 630 may individually comprise one or more cores as described above and are configured to access and execute (at least in part) instructions stored in the one or more memories 632. The one or more memories 632 may comprise one or more CRSMs as described above.

The one or more memories 632 may store instructions for execution by the one or more processors 630 which perform certain actions or functions. These instructions may include an operating system 636 configured to manage hardware resources, such as the interfaces 634, and provide various services to applications executing on the one or more processors 630.

The one or more memories 632 may also store a variety of information, applications, and/or modules related to the display of native application content or non-native application content (e.g., internet browser application content). The applications and modules may include, but are not limited to, interchange applications 638 that may facilitate communication with the user device 102(1). The interchange applications may include, but are not limited to, text messenger applications, voice applications, and video applications similar to those communications applications 106 implemented by the user device 102(1). An availability application may also be included in the interchange applications. The availability application may provide availability information related to the other interchange applications to the user device 102(1). The availability application may operate in a similar manner as the presence module 128 in the user device 102(1).

Figure 7:
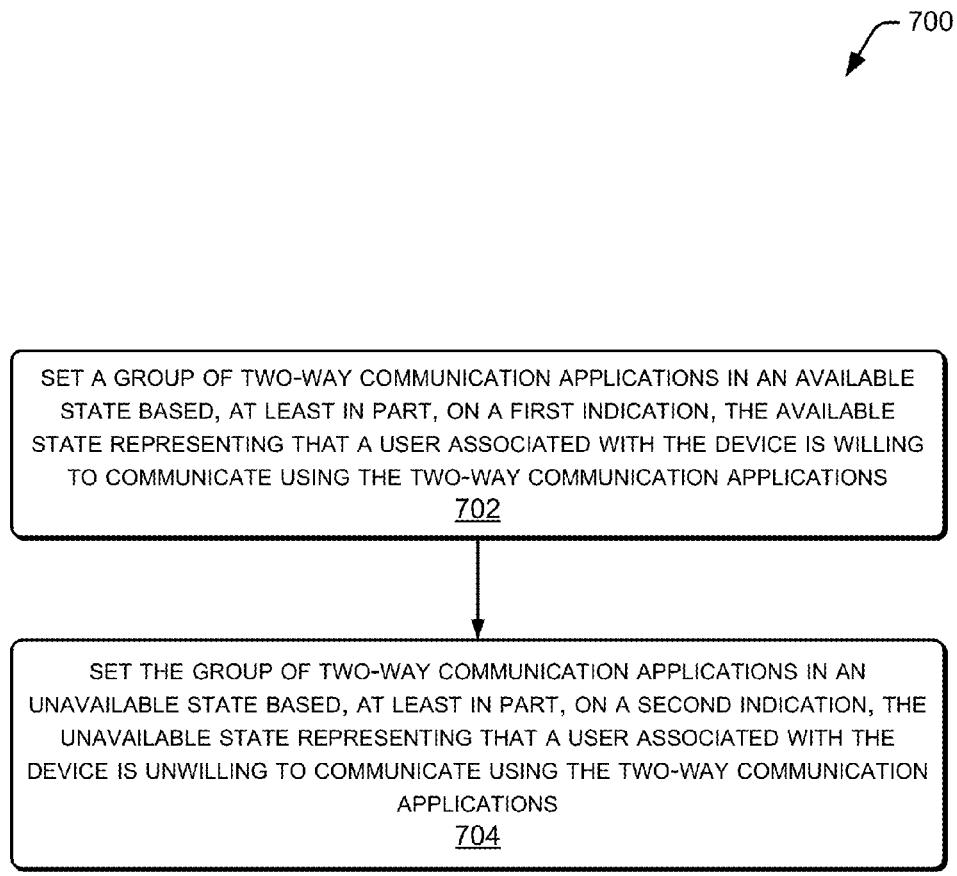
FIG. 7 illustrates a flow diagram for a method for collectively controlling the status of multiple communications applications using a single interface in accordance with one or more embodiments of the disclosure.

FIG. 7 illustrates a flow diagram for a method 700 for collectively controlling the status of multiple communications applications 106 using a single interface 104. In this embodiment, the single interface 104 may list several communication applications that may be implemented by the user device 102(1). The user of the user device 102(1) may indicate whether they are willing to or unwilling to communicate using the communication applications 106 as a whole. In this embodiment, the communication applications 106 may be two-way communication applications that exchange information between the user device 102(1) and the contact user devices 102(N). The method 700 illustrates one embodiment on how collective control may be accomplished. It should be noted that in other embodiments the sequencing of the method 700 may be altered and some steps may be omitted.

At block 702, the presence module 128 may set a group of two-way communication applications 106 into an available state based, at least in part, on receiving an indication at the user device 102(1). The available state may mean that a user associated with the user device 102(1) is willing to communicate using any of the two-way communication applications 106. The presence module 128 may receive the indication in a variety of ways. In one instance, the indication may be associated with selecting an available element 122 displayed on the display screen of the user device 102(1) as shown in FIG. 1. When the available element 122 is selected, the user device 102(1) may provide the availability status to other user devices 102(1) over a network 130. In another instance, the indication may be associated with a physical switch or button associated with the user device 102(1). The switch or button may be associated with a home page, powering the user device 102(1) on/off, toggling the user device 102(1) between a ring mode or a vibrate mode, or any other function that may be associated with a switch or button on the user device 102(1).

At block 704, the presence module 128 may set the group of two-way communication applications 106 into an unavailable state based, at least in part, receiving another indication at the user device 102(1). The unavailable state may mean that a user associated with the user device 102(1) may be unwilling to communicate using any of the two-way communication applications 106. The presence module 128 may receive the indication in a variety of ways. In one instance, the other indication may be associated with selecting an unavailable element 124 displayed on the display screen of the user device 102(1) as shown in FIG. 1. When the unavailable element 124 is selected, the user device 102(1) may provide the unavailability status to other user devices 102(1) over a network 130. In another instance, the other indication may be associated with a physical switch or button associated with the user device 102(1). The switch or button may be associated with a home page, powering the user device 102(1) on/off, toggling the user device 102(1) between a ring mode or a vibrate mode, or any other function that may be associated with a switch or button on the user device 102(1).

In another embodiment, the single collective interface 104 may also include an offline element 126 displayed on the display screen of the user device 102(1). When the offline element 126 is selected, the presence module 128 may place the communication applications in an offline state. In the offline state, the communication applications 106 may not send or receive communications over the network 130.

Figure 8:
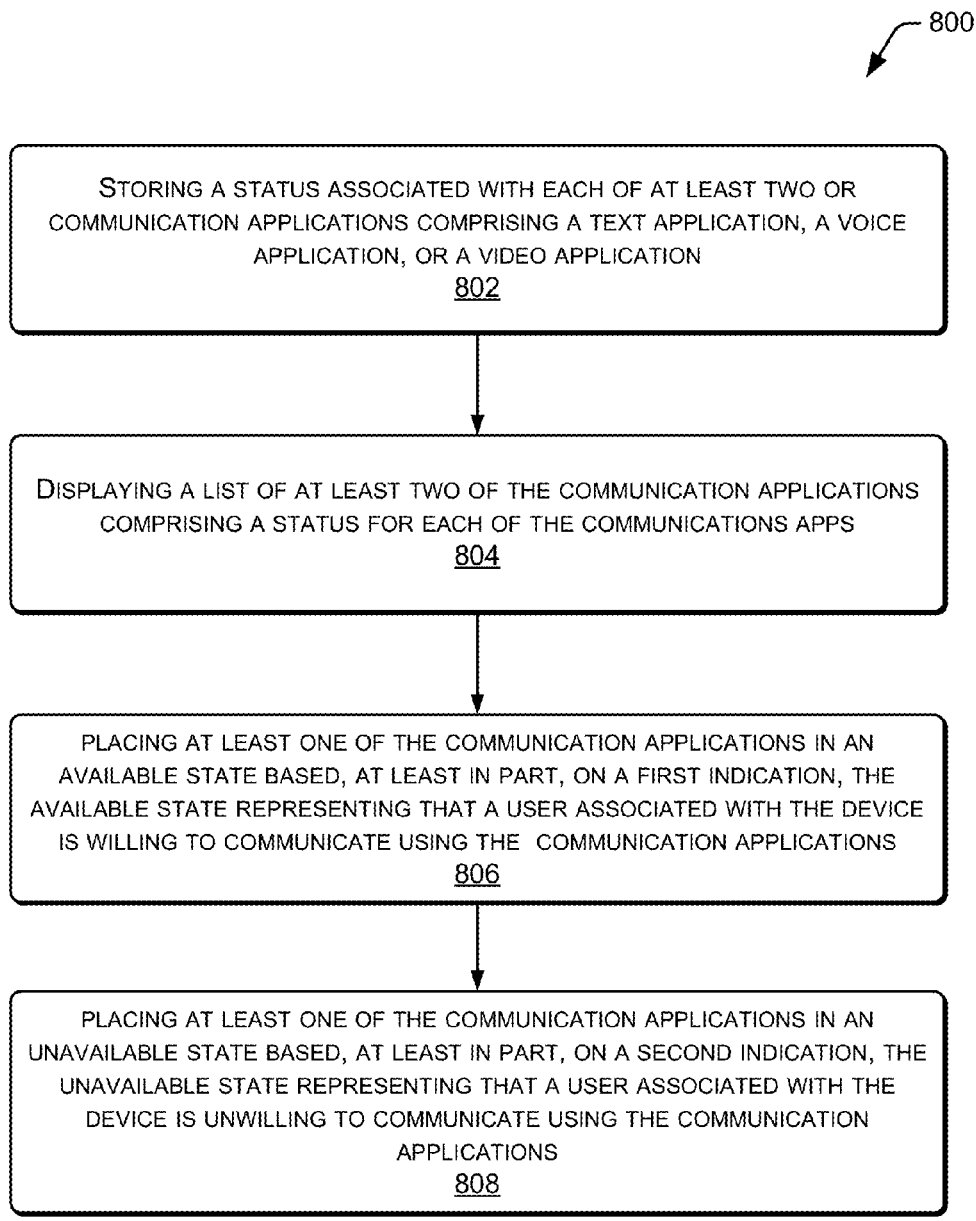
FIG. 8 illustrates a flow diagram for a method for individually controlling the status of multiple communications applications using a single interface in accordance with one or more embodiments of the disclosure.

FIG. 8 illustrates a flow diagram for a method 800 for individually controlling the status of multiple communications applications 106 using an individual interface 202. In this embodiment, the individual interface 202 may indicate an availability status for each of the individual applications 106 associated with the user device 102(1). The method 800 illustrates one embodiment on how individual control of the communication applications 106 may be accomplished. It should be noted that in other embodiments the sequencing of the method 800 may be altered and some steps may be omitted.

At block 802, the presence module 128 may store an availability status for each of the at least two communication applications 106 associated with the user device 102(1). The communication applications 106 may include at least two of the following: a text messenger application 630, a voice application 632, or a video application 634.

At block 804, the presence module 128 may display the availability status of the communication applications 106 using the individual interface 202. The individual interface 202 may also include several communication applications 106 that send/receive texts messages, phone calls, or video calls. The availability status may be located near any feature that may represent a communication application.

At block 806, the presence module 128 may place at least one of the communication applications in an available state based, at least in part, on a first indication received by the user device 102(1). The available state may mean that a user associated with the user device 102(1) is willing to communicate using the at least one communication application. For example, the individual interface 202 may indicate that the user may be willing to communicate using their cellular phone (e.g., voice(2) 116), but they may be unwilling to communicate using their voice over internet protocol phone service (e.g., voice(1) 114). The availability status indicates the user (e.g., user device 102(1)) is more likely to be responsive using the cellular phone rather than the voice over internet protocol phone. In this instance, another user (e.g., contact user device 102(N)) may be able to select the phone application that is more likely to receive a response based, at least in part, on the availability status 204.

In one embodiment, the first indication may be the selection of an on screen element that toggles the availability status 204 between available and unavailable. In another embodiment, the first indication may be the toggling of a physical switch or button associated with the user device 102(1).

At block 808, the presence module 128 may also place at least one of the communication applications in an unavailable state based, at least in part, on a second indication received by the user device 102(1). The unavailable state may mean a user associated with the user device 102(1) is unwilling to communicate using the at least one communication application. For example, the user may be unwilling to communicate using a video application 634. In example, the user may elect to place all of the video applications (e.g., video(1) 118 and video(2) 120) in an unavailable state to inform other users (e.g., contact user devices 102(N)) not to communicate with the user using those communication applications.

In one embodiment, the second indication may be the selection of an on screen element that toggles the availability status 204 between available and unavailable. In another embodiment, the second indication may be the toggling of a physical switch or button associated with the user device 102(1).

Figure 9:
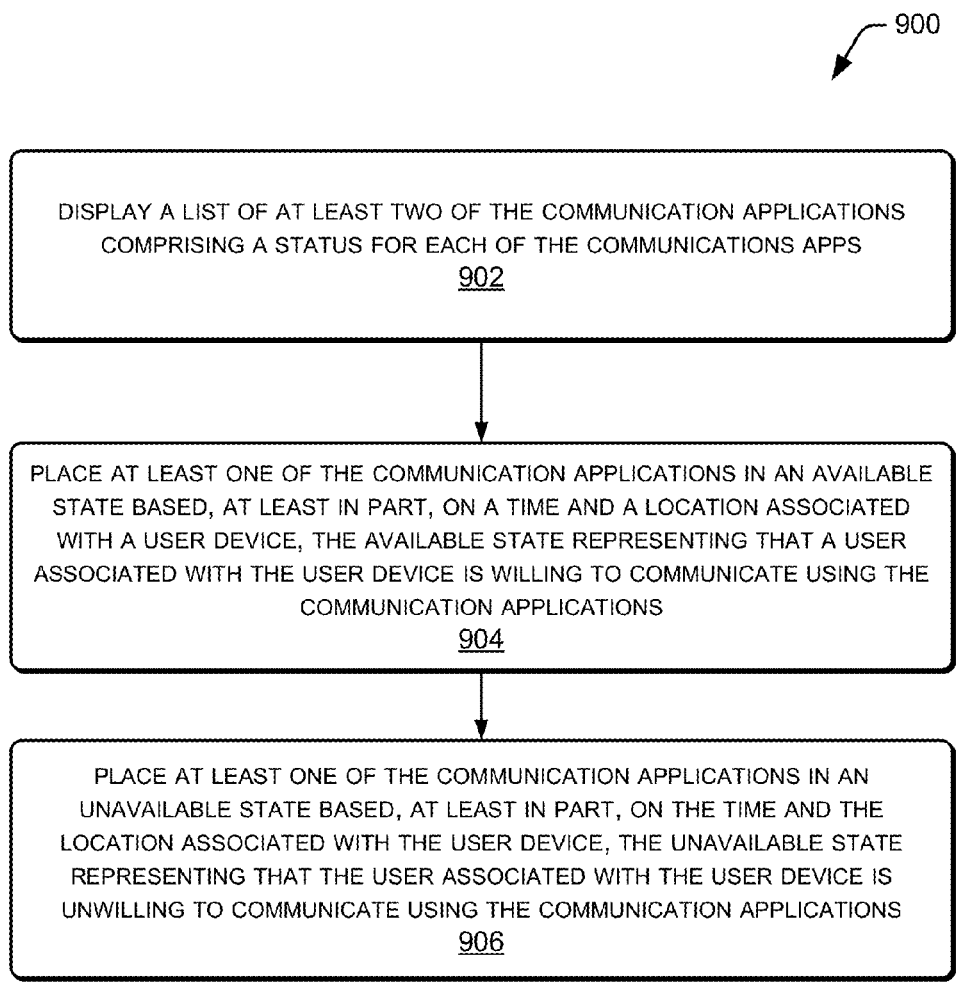
FIG. 9 illustrates a flow diagram for a method for determining communication application availability based on a location and/or time associated with a user device in accordance with one or more embodiments of the disclosure.

FIG. 9 illustrates a flow diagram for a method 900 for determining communication application availability based on a location and/or time associated with a user device 102(1). The presence module 128 may store guidelines for communication application 106 availability that may be based on the location of the user device 102(1). The location module may periodically provide location information to the presence module 128 and the operating system 626 may periodically provide the time or date to the presence module 128. The method 900 illustrates one embodiment of how the presence module 128 may provide the location and time to determine which communication applications 106 may be available, unavailable, or offline. It should be noted that in other embodiments the sequencing of the method 900 may be altered and some steps may be omitted.

At block 902, the user device 102(1) may display a list of at least two of the communication applications 106 comprising an availability status 302 for each of the communications apps 106.

At block 904, the presence module 128 may place at least one of the communication applications (e.g., messenger(1) 110) in an available state based, at least in part, on a time and a location associated with the user device 102(1). The available state representing that a user associated with the user device is willing to communicate using the at least one communication application. For example, availability guidelines stored at the presence module 128 may indicate that the text messenger(1) 110 communication application may be available when the user device 102(1) may be located at location(1) 310 (e.g., work) during a certain time window (e.g., time(1) 314). When the location and time guidelines are met, the presence module 128 may place the text messenger(1) 110 in an available state.

At block 906, the presence module 128 may place at least one of the communication applications 106 in an unavailable state based, at least in part, on the time and the location associated with the user device 102(1). The unavailable state representing that the user associated with the user device 102(1) is unwilling to communicate using the at least one communication application. For example, availability guidelines stored at the presence module 128 may indicate that the text messenger(1) 110 communication application may be unavailable when the user device 102(1) may be located at location(2) 312 (e.g., home) during a certain time window (e.g., time(3) 318). When the location and time guidelines are met, the presence module 128 may place the text messenger(1) 110 in an unavailable state.

Figure 10:
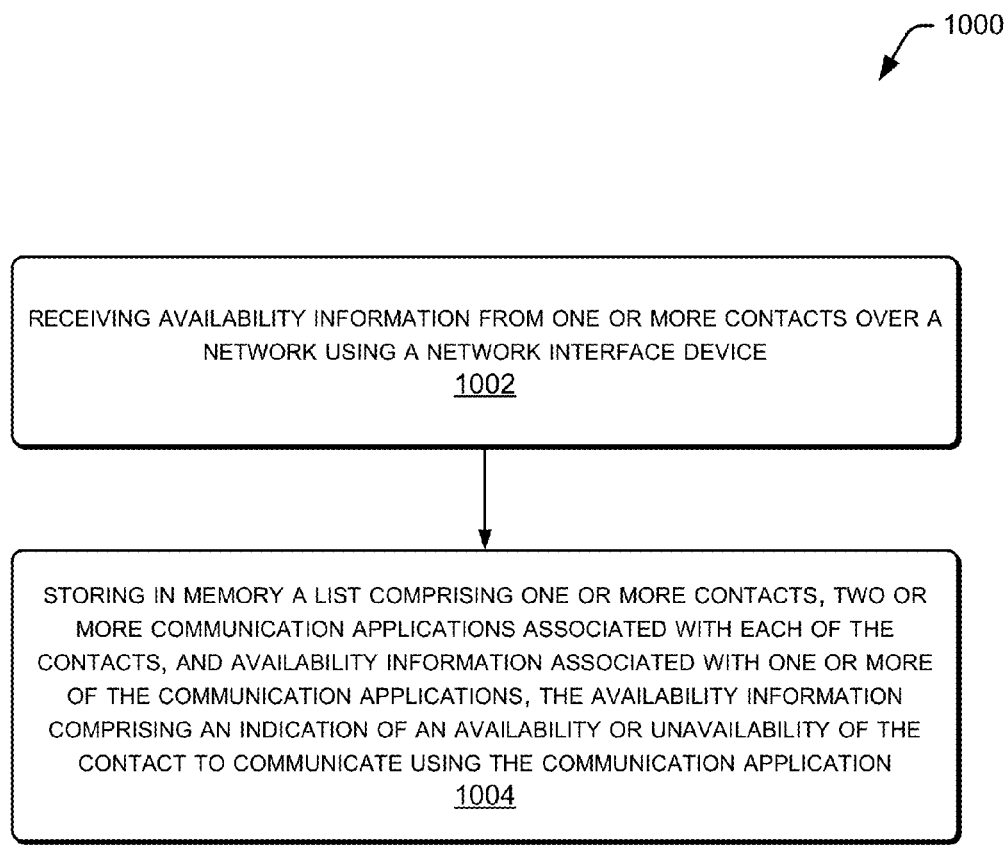
FIG. 10 illustrates a flow diagram for a method for generating a contact list that indicates communication availability for multiple communication applications associated with a contact in accordance with one or more embodiments of the disclosure.

FIG. 10 illustrates a flow diagram for a method 1000 for generating a contact list 402 that indicates communication availability for multiple communication applications associated with a contact(1) 410. The user device 102(1) may generate the contact list based, at least in part, on contact information 408 from the contacts/calendar module 320 and the availability information 404 provided by the other contact user devices 102(N). The method 1000 illustrates one embodiment of how the presence module 128 may generate the contact list 402. It should be noted that in other embodiments the sequencing of the method 1000 may be altered and some steps may be omitted.

At block 1002, the presence module 128 may receive availability information from one or more contacts (e.g. contact(1) 410) over a network 130 using a network interface device 610. The presence module 128 may receive contact information 408 from the contacts/calendar module 320 or provide the availability information to the contacts/calendar module 320.

At block 1004, the user device 102(1) may store in memory a list 402 comprising one or more contacts (e.g., contact(1) 410), two or more communication applications (e.g., messenger(1) 414 and voice(1) 418) associated with each of the contacts, and availability information 404 associated with one or more of the communication applications 106. The availability information comprising an indication of an availability or unavailability of the contact (e.g., contact(1) 410) to communicate using the communication applications.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
   at least one memory that stores computer-executable instructions for two-way communication applications, the two-way communication applications comprising at least two of the following:
   a text communication application;
   an audio communication application; or
   a video communication application;

at least one network interface device to communicate over at least one network comprising, the network comprising:
   a personal area network;
   a wireless local area network; or
   a cellular network;
at least one processor configured to access the at least one interface device and the at least one memory and execute the computer-executable instructions to:
receive an available indication at a first time that collectively places a plurality of the two-way communication applications in an available state that indicates a user associated with the plurality of the two-way communication applications is available to communicate with a remote device over the one or more networks;
receive an unavailable indication at a second time after the first time that collectively places the plurality of the two-way communication applications in an unavailable state that indicates that the user associated with the plurality of the two-way communication applications is unavailable to communicate with the remote device over the one or more networks; and
receive an offline indication at a third time different from the first time and the second time that collectively places the plurality of the two-way communication applications in an offline state that indicates the plurality of the two-way communication applications are offline,
wherein the available indication, the unavailable indication, and the offline indication are each based, at least in part, on respective user indications, the respective user indications including no more than a single input provided by a user.

2. The device of claim 1, wherein:
the receiving of the available indication is based, at least in part, on an availability element presented on a display screen associated with the device,
the receiving of the unavailable indication is based, at least in part, on an unavailability element presented on the display screen,
the receiving of the offline indication is based, at least in part, on an offline element presented on the display screen.

3. The device of claim 1, wherein:
the receiving of the available indication is based, at least in part, on a switch that places the device in a ring mode,
the receiving of the unavailable indication is based, at least in part, on the switch that places the device in a vibrate mode.

4. The device of claim 3, wherein the receiving of the offline indication is based, at least in part, on an on/off switch for the device.

5. The device of claim 1, wherein the single input is received from a collective application comprising a list of the two-way communication applications associated with the device.

6. The device of claim 1, wherein the single input is received from one of the two-way communication applications associated with the device.

7. A device, comprising:
at least one memory that stores computer-executable instructions for a plurality of two-way communication applications comprising at least two of the following:
   a text communication application;
   an audio communication application; or
   a video communication application;
at least one processor configured to access the at least one interface device and the at least one memory and execute the computer-executable instructions to:
receive a single first user input from the interface device at a first time;
set, based on the single first user input, at least a first two-way communication application of the plurality of two-way communication applications and a second two-way communication application of the plurality of two-way communication applications in an available state, wherein in the available state the device communicates using the plurality of two-way communication applications;
receive a single second user input user from the interface device at a second time after the first time; and
set, based on the single second user input, at least the first two-way communication application of the plurality of two-way communication applications and the second two-way communication application of the plurality of two-way communication applications in an unavailable state, wherein in the unavailable state the device does not communicate using the plurality of two-way communication applications.

8. The device of claim 7, further comprising computer-executable instructions to:
set the first two-way communication application and the second two-way communication application in an offline state based, at least in part, on any button or any switch associated with the device; and
providing the state to at least one network using a network interface device.

9. The system of claim 7, wherein:
the single first input comprises determining a first electronic interactive element is selected;
the single second input comprises determining a second electronic interactive element is selected.

10. The system of claim 7, wherein:
the single first input comprises determining the device is in a ring tone mode;
the single second input comprises determining the device is in a silent mode.

11. The device of claim 7, wherein the first two-way communications application and second two-way communications application comprise a text based application, a audio application, and a video application.

12. The device of claim 7, wherein the audio application comprises a cellular telephone or a voice over internet protocol application that uses a wireless local area network to send and receive voice data.

13. A method comprising:
receiving in memory, status indicators associated with a group of multi-way communications applications comprising at least two or more of the following: a text communication application, an audio communication application, or a video communication application;
receiving a single first user input from an interface device at a first time;
setting, based on the single first user input, the group of multi-way communication applications in an available state, wherein in the available state the device communicates using the multi-way communication applications with a network interface device;
receiving a single second user input user from the interface device at a second time after the first time; and
setting, based on the single second user input, the multi-way communication applications in an unavailable state, wherein in the unavailable state the device does not communicate using the multi-way communication applications and the network interface device.

14. The method of claim 13, wherein:
the single first user input comprises determining a first electronic interactive element is selected; and
the single second user input comprises determining a second electronic interactive element is selected.

15. The method of claim 13, wherein:
the single first user input comprises determining the device is in a ring tone mode; and
the single second user input comprises determining the device is in a vibrate mode.

16. The method of claim 13, wherein the first user input or the second user input are based, at least in part, on a location associated with the device.

17. The method of claim 13, wherein the single first user input or the single second user input are based, at least in part, on a time associated with the device.

18. The method of claim 13, wherein the multi-way communications applications comprise at least two text communication applications and at least two audio communication applications.

19. The method of claim 13, wherein the group of multi-way communications applications comprise all of the multi-way communications applications associated with the device.

20. The method of claim 13, wherein the multi-way communications applications are configured to communicate with at least two other multi-way communication applications in one session.

21. One or more non-transitory computer-readable media storing computer-executable instructions that, when executed by at least one processor, configure the at least one processor to perform operations comprising:
storing, in memory, a status associated with each of at least two or more communication applications comprising at least two or more of the following: a text communication application, an audio communication application, or a video communication application;
displaying, on a display screen, a list of at least two of the two or more communication applications comprising a status for each of the communications applications;
setting at least two of the two or more communication applications in an available state in response to a single selection of a first individual interface of the display screen, the available state representing that the device will communicate using the communication applications; and
setting at least two of the two or more communication applications in an unavailable state in response to a single selection of a second individual interface of the display screen, the unavailable state representing that the device will not communicate using the communication applications.

22. The device of claim 1, wherein the available indication, the unavailable indication, and the offline indication are further each based on at least one of time or location.

23. The device of claim 7, wherein the computer-executable instructions to set the first two-way communication application and second two-way communication application in the available state is further based on at least one of time or location; and
wherein the computer-executable instructions to set the first two-way communication application and second two-way communication application in the unavailable state further based on at least one of time or location.

24. The method of claim 13, wherein:
setting the group of multi-way communication applications in the available state is further based on at least one of time or location; and
setting the multi-way communication applications in the unavailable state is further based on at least one of time or location.

25. The device of claim 1, wherein the text communication application is a first text communication application, the audio communication application is a first audio communication application, and the video communication application is a first video communication application, and wherein the two-way communication application further comprises one or more second text communication applications, one or more second audio communication applications, or one or more second video communication applications.

26. The device of claim 7, wherein the text communication application is a first text communication application, the audio communication application is a first audio communication application, and the video communication application is a first video communication application, and wherein the two-way communication application further comprises one or more second text communication applications, one or more second audio communication applications, or one or more second video communication applications.

27. The method of claim 13, wherein the text communication application is a first text communication application, the audio communication application is a first audio communication application, and the video communication application is a first video communication application, and wherein the two-way communication application further comprises one or more second text communication applications, one or more second audio communication applications, or one or more second video communication applications.

28. The one or more non-transitory computer-readable media of claim 21, wherein the text communication application is a first text communication application, the audio communication application is a first audio communication application, and the video communication application is a first video communication application, and wherein the two-way communication application further comprises one or more second text communication application, one or more second audio communication application, or one or more second video communication application.

* * * * *